United States Patent
Liu (10) Patent No.: US 8,374,480 B2
(45) Date of Patent: Feb. 12, 2013

(54) METHOD AND APPARATUS FOR VIDEO IMAGE DATA RECORDING AND PLAYBACK

(75) Inventor: Yi-Li Liu, Delta (CA)

(73) Assignee: ATEN International Co., Ltd., Shijr (TW)

( * ) Notice: Subject to any disclaimer, the term of this patent is extended or adjusted under 35 U.S.C. 154(b) by 553 days.

(21) Appl. No.: 12/625,467

(22) Filed: Nov. 24, 2009

(65) Prior Publication Data

US 2011/0123169 A1   May 26, 2011

(51) Int. Cl.
*H04N 5/935* (2006.01)
(52) U.S. Cl. .................. 386/210; 386/224; 386/226
(58) Field of Classification Search ............... 386/210, 386/224, 226
See application file for complete search history.

(56) References Cited

U.S. PATENT DOCUMENTS

| | | | | |
|---|---|---|---|---|
| 6,081,833 | A * | 6/2000 | Okamoto et al. | 709/213 |
| 6,397,351 | B1 * | 5/2002 | Miller et al. | 714/13 |
| 2004/0109197 | A1 * | 6/2004 | Gardaz et al. | 358/1.15 |
| 2008/0002771 | A1 * | 1/2008 | Chen | 375/240.16 |
| 2008/0019661 | A1 * | 1/2008 | Obrador et al. | 386/52 |
| 2009/0177718 | A1 * | 7/2009 | Patterson et al. | 707/204 |

\* cited by examiner

*Primary Examiner* — Thai Tran
*Assistant Examiner* — Jose Mesa
(74) *Attorney, Agent, or Firm* — Chen Yoshimura LLP (57) ABSTRACT

A video data recoding method suitable for recording computer sessions. Each video image frame is divided into multiple blocks. A server processes the video frames and transmits only changed blocks for each frame to a video log server. The video log server stores the changed blocks with block indices in a data file. The video log server also maintains a virtual frame table which stores, for each block of the frame, the data location within the data file where the most recent occurrence of that block is stored. The virtual frame table is continuously updated as changed blocks are stored in the data file. The video log server further stores a snapshot file containing snapshots of the virtual frame table at predetermined time points, along with time stamps and a next changed frame location. The data file and the snapshot file are used to reproduce the video images.

12 Claims, 6 Drawing Sheets

| Block 1 of initial frame with index | Block 2 of initial frame with index | ... | Last block of initial frame with index | Time stamp | Changed block with index | ... |

| Time stamp | Changed block with index | Changed block with index | ... | Time stamp | Changed block with index | ... |

Fig. 6

| Time stamp | Virtual frame table | Next changed frame location | Time stamp | Virtual frame table | Next changed frame location | Time stamp | ... |

METHOD AND APPARATUS FOR VIDEO IMAGE DATA RECORDING AND PLAYBACK

BACKGROUND OF THE INVENTION

1. Field of the Invention

This invention relates to video image recording and playback, and in particular, it relates to methods and apparatus for recording and playing back video images for a computer session.

2. Description of the Related Art

Video image recording is widely used in many practical applications. In many applications, the video images are either slow-changing (e.g. they often remain unchanged for extended period of time), or remain unchanged for large portions of the image (e.g. changes often occur only in small or scattered areas). One example is the recording and playing back of a computer session, i.e., the recording and playing back of the video images outputted by a computer to a user's monitor. In such an example, often large portions of the video image displayed on the monitor are unchanged. Another example of such an application is video surveillance, i.e. the recording and playing back of video images from a surveillance camera.

MPEG (including MPEG-1, MPEG-2, etc.) is a standard for widely used in digital video image compression and recording. MPEG uses interframe compression, i.e., compressing the current frame by using one or more earlier or later frames in a sequence, to reduce frame to frame redundancy. In interframe compression, certain frames, known as intra-frames or "I-frames", are compressed without referencing to other frames. All blocks in the I-frame have the same timecode. Thus, MPEG's interframe compression tends to be inefficient for the above-discussed type of video signals.

SUMMARY OF THE INVENTION

The present invention is directed to a video image data recording method that substantially obviates one or more of the problems due to limitations and disadvantages of the related art.

An object of the present invention is to provide a digital video image data compression, recording and reproduction method suitable and efficient for recording a computer session.

Another object of the present invention is to provide a compressed image data format that is flexible and efficient and offers high compression ratio.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a video recording method implemented in a system which includes a video data transmitting device and a video data recording device, wherein a recording process implemented in the video data recording device includes: (a) receiving input video data, wherein the input video data include a plurality of initial blocks of data collectively representing an initial frame of video image, and further include, for each subsequent changed frame of video image, a time stamp for the changed frame and one or more subsequent blocks of data representing changed blocks of that frame, and wherein the input video data further include a block index associated with each initial and subsequent block of data to indicate a position of the block within the frame of video image; (b) storing the initial blocks of data with the associated block indices in a data file, and storing a data location for each initial block in a virtual frame table, wherein the data location for a block indicates a location in the data file where the block is stored; (c) for each subsequent changed frame of video image, storing the changed blocks of data with the associated block indices in the data file, and updating the virtual frame table by replacing existing data locations for the changed blocks with new data locations; and (d) at each of a plurality of predetermined time points, storing in a snapshot file a time stamp for the time point, a current copy of the virtual frame table at the time point, and a next changed frame location indicating a location in the data file where data for a next changed frame after the time point will be stored, wherein the initial blocks for the initial frame and the changed blocks for the subsequent frames are stored in the data file sequentially.

In another aspect, the present invention provides a computer program product comprising a computer usable medium having a computer readable program code embedded therein for controlling a video data recording device, the computer readable program code configured to cause the video data recording device to execute the above video data recording process.

In another aspect, the present invention provides a method implemented in a video player for reproducing video images from recorded video data, the recorded video data including a data file and a snapshot file, wherein the data file stores a plurality blocks of data including zero or more changed blocks for each frame of video data, each block of data being stored with an associated block index, wherein the snapshot file includes a plurality of time point records for a plurality of time points, each time point record including a time stamp representing a time of the time point, a copy of a virtual frame table for that time point, and a next changed frame location representing a data location within the data file for storing the next frame after that time point, wherein the copy of the virtual frame table stores, for each block in a frame as represented by the block index, a data location within the data file where a most recent occurrence of that block is stored, the method including: (a) receiving a video reproduction request specifying a requested starting time; (b) searching the snapshot file to identify a time point having a time stamp before the requested starting time as a starting time point; (c) reading the snapshot file to obtain the virtual frame table and the next changed frame location for the starting time point; (d) using the data locations stored in the virtual frame table, reading the data file at the data locations to obtain the blocks of the frame and their associated block indices; (e) processing the blocks read in step (d), and assembling the blocks using the block indices to form a first frame of reproduced video image; (f) using the next changed frame location obtained in step (c), reading the data file continuously starting from the next changed frame location to obtain changed data blocks for changed frames; and (g) for each changed frame, processing the blocks read in step (f) for that frame, and replacing corresponding blocks of a previous frame with the processed blocks based on the associated block indices to form a new frame of reproduced video image.

In another aspect, the present invention provides a computer program product comprising a computer usable medium having a computer readable program code embedded therein for controlling a video player device, the computer readable program code configured to cause the video player device to execute the above process for reproducing video images from recorded video data.

It is to be understood that both the foregoing general description and the following detailed description are exemplary and explanatory and are intended to provide further explanation of the invention as claimed.

DETAILED DESCRIPTION OF THE PREFERRED EMBODIMENTS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

The image data format and related video image compression, recording and reproducing methods according to embodiments of the present invention are applicable in video image gathering, encoding, compression, recoding, storage, reproduction, broadcast, etc. The invention is also advantageous in systems involving multi-channel video signals, such as multi-channel KVM switch systems, multi-channel video surveillance systems, etc.

Figure 1:
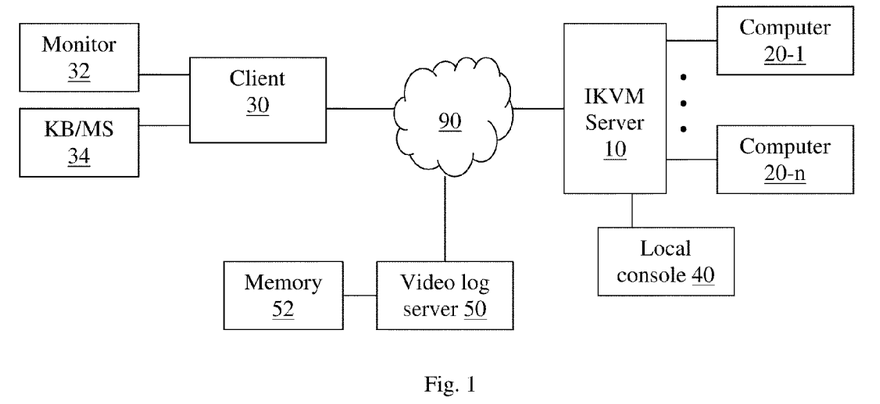
FIG. 1 illustrates an IKVM system in which embodiments of the present invention may be implemented.

FIG. 1 illustrates a KVM (keyboard, video, mouse) switch system implementing a video image recording function. A KVM switch is a device that can connect one or more user consoles to a plurality of computers. Each user console includes a monitor and user input devices such as a keyboard and a mouse. The user console can be connected directly to the KVM switch (referred to as a local console), or connected to the KVM switch over a network (referred to as a remote console). The network may be the Internet, a WAN, a LAN, or any other suitable network. The remote console is typically connected to a client computer which is connected to the network. The KVM switch may also be referred to as the KVM server. In the system shown in FIG. 1, the KVM server 10 is referred to as an IKVM server or KVM-over-IP server because it supports client computers located over a network. The IKVM server 10 is connected to a plurality of computers 20 (20-1 to 20-n). A local console 40 is connected directly to the IKVM server 10; a remote console including a client 30, a monitor 32 and user input devices (keyboard and/or mouse) 34 is connected to the IKVM server 10 via a network 90. The IKVM server 10 connects each user console 30, 40 to a selected one of the computers 20. The IKVM server transmits the video images from the selected computer to the user console, and transmits user input signals such as keyboard and mouse signals from the user console to the selected computer.

Figure 2:
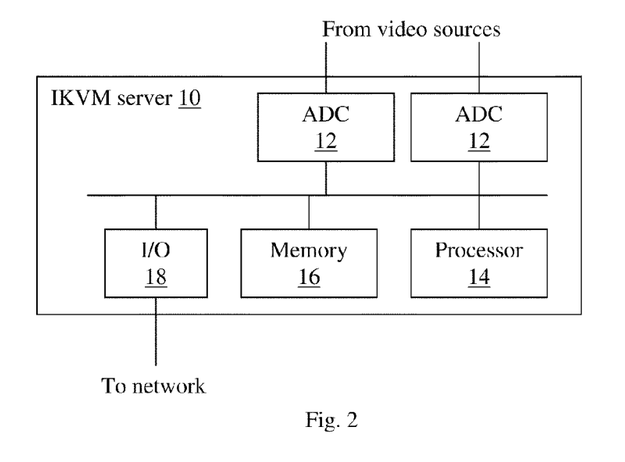
FIG. 2 illustrates the structure of an IKVM server in the IKVM system of FIG. 1.

FIG. 2 illustrates an exemplary structure of the IKVM server 10. The IKVM server 10 includes a plurality of analog to digital converters (ADC) 12. Each ADC 12 can be connected to a selected computer (a video source) via a video switch (not shown). Each video source and corresponding ADC 12 may be referred to as a video channel, and the IKVM server 10 is referred to as a multi-channel IKVM. The ADCs 12 convert analog video signals from the video sources to digital video image data. The processor 14 processes the video image data outputted by the ADCs 12 and transmits them to the network via a network interface section 18 for transmission to the remote console 30. The processing performed by the processor 14 may include, for example, scaling, detection of changed portions of the image, compression, etc. The connection to the local console 40 (e.g. a USB connection) is not shown in FIG. 2. The IKVM server 10 also includes a memory 16, as well as other components of a conventional KVM server, such as video and keyboard/mouse signal switching circuits, etc., not shown in FIG. 2.

The IKVM switch system of FIG. 1 implements a session log function to record relevant information of a session of communication between the user console and the selected computer. The session log includes non-video information such as keyboard data, mouse data, username, port number, access time, bus ID, login and logout event, etc., as well as video images outputted by the computer to the monitor of the user console. A video log server 50 is provided to process and record the session information including video images, and reproduce the session information including reproducing the video images to a user. The recording of non-video information is generally known in the art; the present disclosure focuses on the recording of a video log. The video log server 50 may have a mass storage device 52 attached to it for storing the video log data. In the system shown in FIG. 1, the video log server 50 is connected to the IKVM server 10 via the network 90. Of course, the video log server 50 may also be connected to the IKVM switch via a separate network, or corrected directly to the IKVM server, or it can be a part of the IKVM server 10. Alternatively, the video log server 50 may also be a part of a client computer 30.

To implement the session log function for a video channel, the IKVM server 10 generates video image data for the video channel and transmits the data to the video log server 50. The video image data transmitted to the video log server 50 may be the same video image data transmitted to the client 30, or they may be different. The video log server 50 processes, records and reproduces the video image data in a manner described below with reference to FIGS. 3-8.

Figure 3:
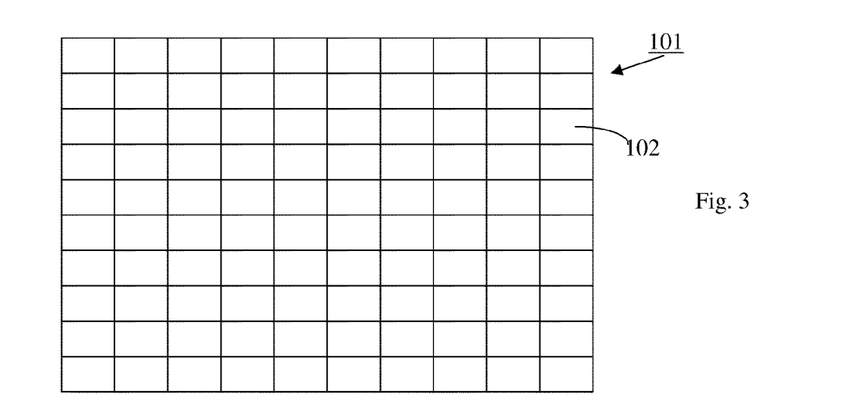
FIG. 3 schematically illustrates a frame of video data divided into a plurality of blocks in a video data recording method according to an embodiment of the present invention.
Figure 4:
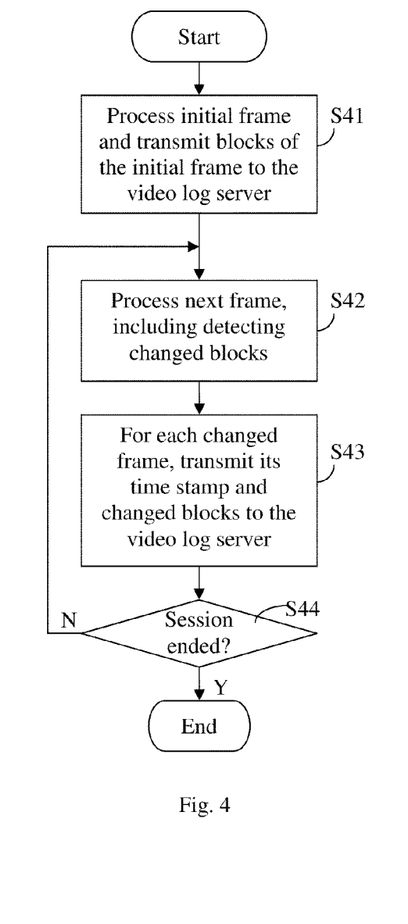
FIG. 4 illustrates a video data processing method according to an embodiment of the present invention performed by the IKVM server of the IKVM system shown in FIG. 1.
Figure 5:
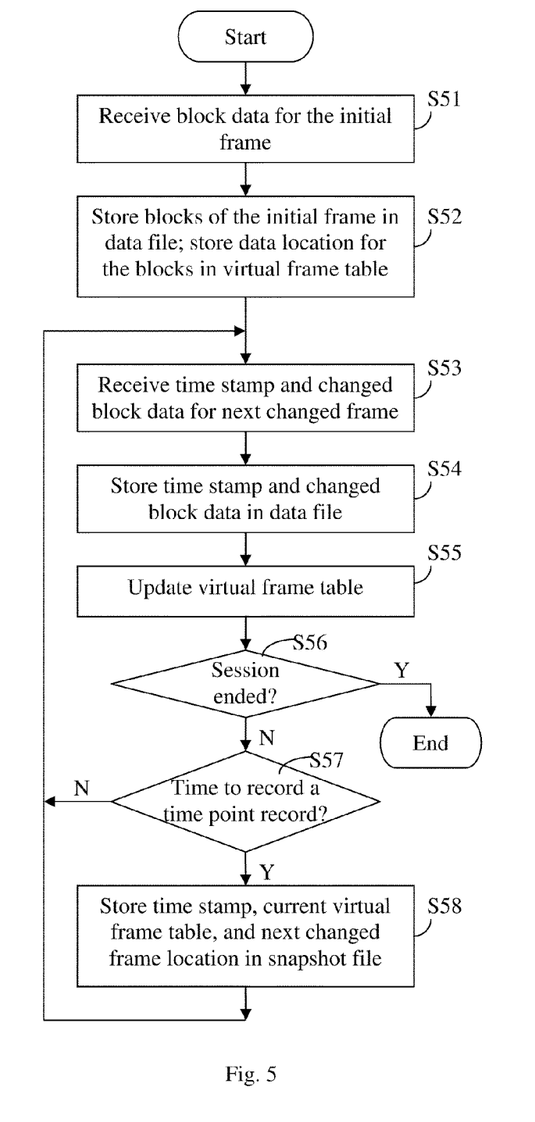
FIG. 5 illustrates a video data recording method according to an embodiment of the present invention performed by the video log server of the IKVM system shown in FIG. 1.
Figure 6:
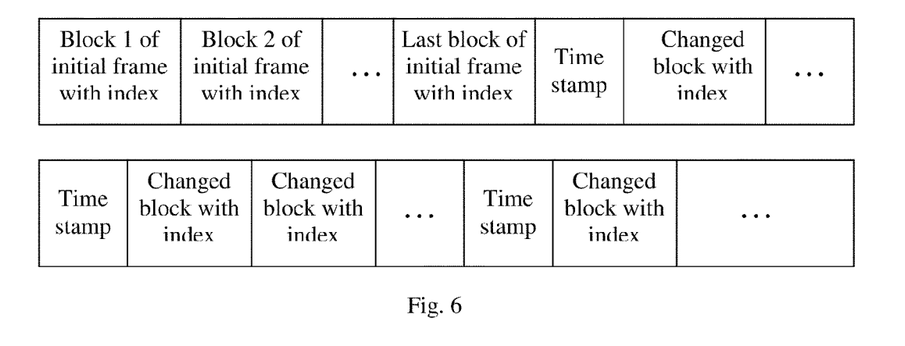
FIG. 6 illustrates a data file generated by the data recording method according to an embodiment of the present invention.
Figure 6A:
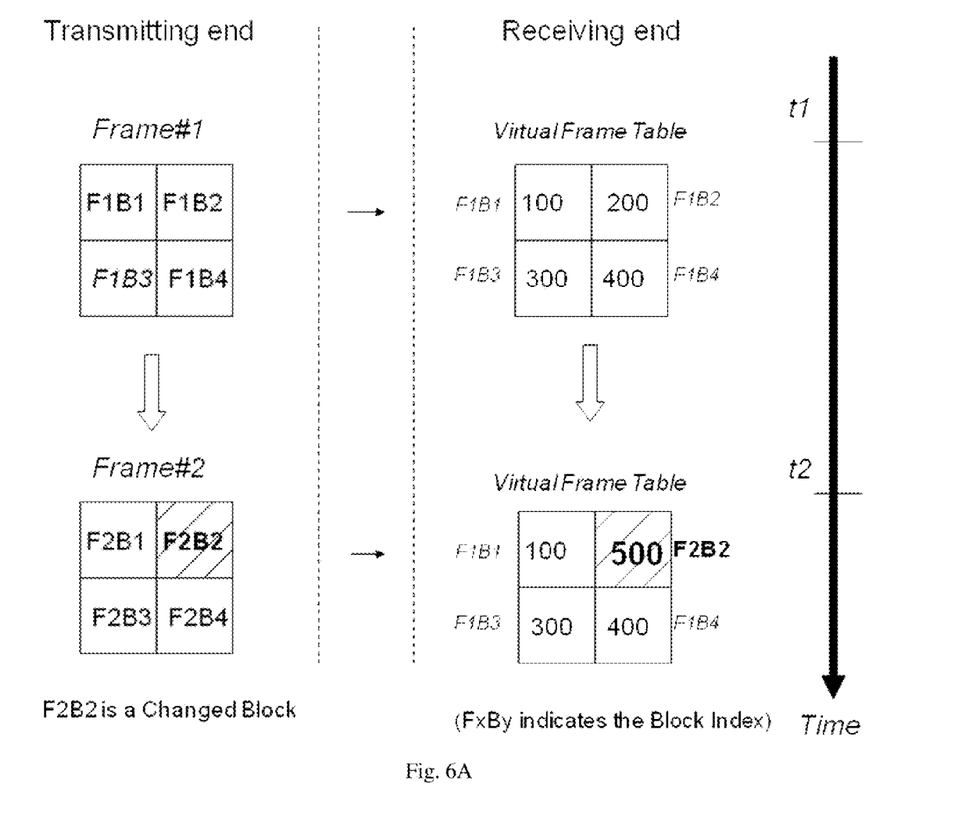
FIG. 6A schematically illustrates the relationship between the frames being transmitted at the transmitting end (KVM server) and the virtual frame table maintained at the receiving end (video log server).
Figure 7:
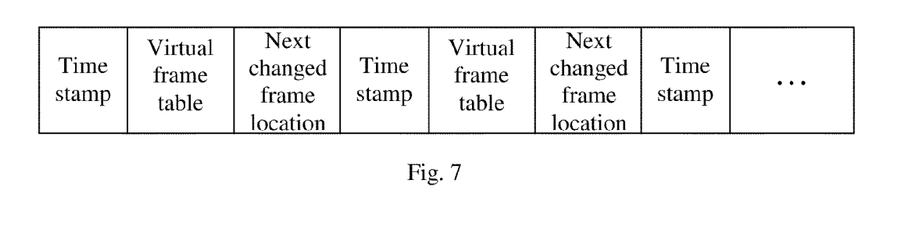
FIG. 7 illustrates a snapshot file generated by the data recording method according to an embodiment of the present invention.
Figure 8:
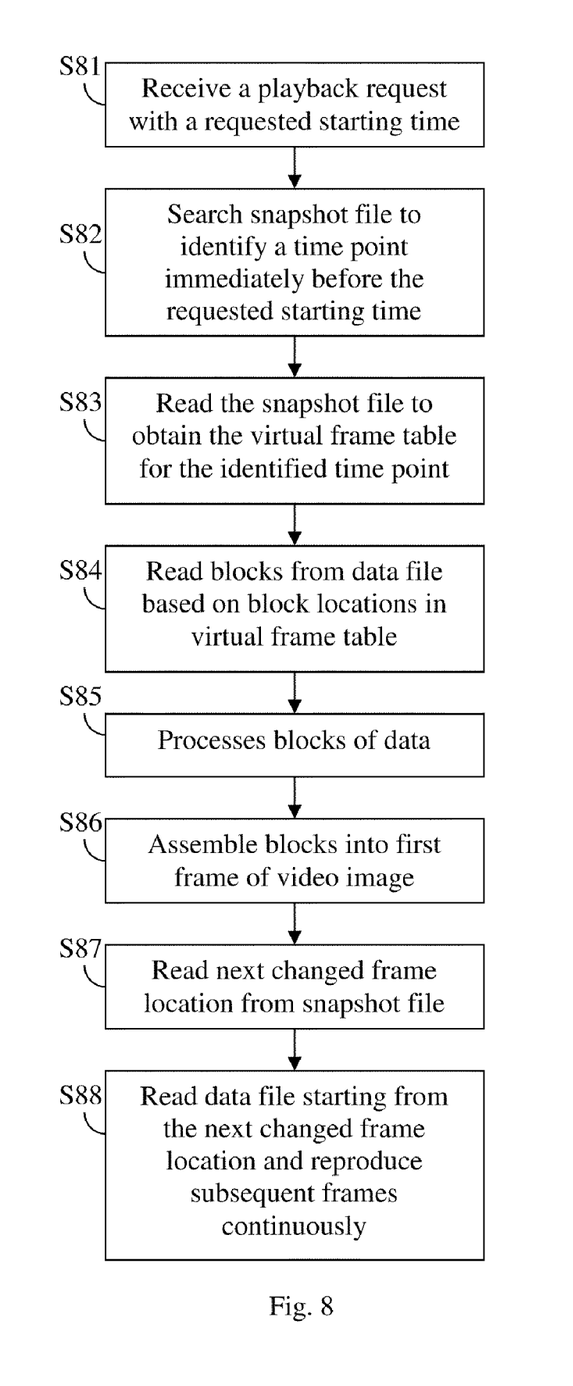
FIG. 8 illustrates a video data reproducing method according to an embodiment of the present invention performed by a video player device.

FIG. 3 illustrates a frame of video image divided into a plurality of blocks. FIG. 4 illustrates a video image transmission process performed by the IKVM server 10. FIG. 5 illustrates a recording process performed by the video log server 50. FIGS. 6A to 7 schematically illustrate a data file and a snapshot file recorded by the video log server 50. FIG. 8 illustrates a playback process performed by the video log server 50 or other player devices.

As shown in FIG. 3, each frame 101 of video image being processed is divided into a plurality of blocks 102. For example, each block 102 may be 16 by 16 pixels, or the frame may be divided into 64 by 48 blocks for a video resolution of 1024 by768 pixels. Each block within the frame is designated by a block index. For example, the blocks of a frame may be counted sequentially from left to right and top to bottom starting from the upper-left hand corner; the block index in this case is an integer indicating the position in the count. Alternatively, the block index may be a pair of integers representing the line and column numbers of its position.

FIG. 4 illustrates a video image transmission process performed by the IKVM server 10. The process may be implemented by software or firmware stored in the IKVM server 10. The processor 14 of the IKVM server 10 processes each frame of video image by dividing it into the blocks 102 shown in FIG. 3 and processes and compressed each block individually. At the beginning of each recorded video session, the IKVM server 10 processes and transmits to the video log server 50 one complete video frame (the initial frame), consisting of a plurality of initial blocks (step S41). The image data for each block may be compressed, and any suitable compression method may be used, such as JPEG, etc. Thereafter, the IKVM server 10 processes the subsequent frames (step S42), and only transmits changed frames containing changed blocks to the video log server 50 (step S43), until the session ends ("Y" in step S44). More specifically, in step S42, the IKVM server 10 compares each block of a frame to the corresponding block in the previous frame to detects any changes in each block, and compresses the changed blocks.

Note that step S41 can be considered a special case of step S42, and the initial frame can be considered a special case of a subsequent frame where all blocks are changed blocks.

For each video frame that contains changes (referred to as a changed frame), the IKVM server 10 transmits a time stamp of the frame followed by the changed blocks (step S43). In steps S41 and S43, each block transmitted by the IKVM server 10 is transmitted with its block index.

In a preferred embodiment, the time stamp is a number that represents either an absolute time value or a relative time value. The absolute time value represents the absolute time with a precision of one second; the relative time value represents the number of fraction of one second since the last absolute time value. If the time of a changed frame is more than one second since the time of the last changed frame, an absolute time stamp is used for the frame. If the time of a changed frame is less than one second since the time of the last changed frame that was given an absolute time value, an absolute time stamp is used for the frame. In one implementation, the time stamp is a 4 byte number; the relative time stamp is an integer value between 0 and 999 representing the number of milliseconds since the last absolute time value; the absolute time stamp is an integer value representing the number of seconds since a pre-defined absolute time point, such as 00:00:00 on Jan. 1, 2000. The absolute time stamp may also be defined by year, month, date, hour, minute and second. The absolute time may be Greenwich Time or the local time where the client is located in. An absolute time stamp and a relative time stamp may be distinguished by whether or not its value is greater than 999.

In an alternative embodiment, an initial time stamp indicates an absolute time of the start of the recorded session, and all subsequent time stamps represent a relative time since the last transmitted frame.

The data transmitted by the server 10 is recorded by the video log server 50. The video log server 50 maintains the following data for each video channel it records:

(1) A data file (see FIG. 6), which stores blocks of image data sequentially as they are received from the IKVM server; the block index of each block is stored with the block. Thus, at the beginning of the data file, all blocks of the initial frame are stored. Thereafter, as the time stamp and the changed blocks for each changed frame are received from the IKVM server 10, they are stored in the data file sequentially. During video recording, new data is continuously appended to the data file and no data is overwritten. The data file is preferably stored in the storage device 52 of the video log server 50.

(2) A virtual frame table which stores, for each block of the video frame as represented by its block index, the data location within the data file where the most recent occurrence of that block is stored. A data location within the data file may be represented by an offset from the beginning of the data file. The location of the beginning of a block is typically used as the data location of that block. Initially, the virtual frame table stores the data locations of the blocks of the initial frame. Thereafter, the virtual frame table is updated each time a changed block is recorded in the data file, so the new data location replaces (overwrites) the existing data location for that block in the virtual frame table.

The virtual frame table may be thought of as a virtual frame which is divided into virtual blocks in the same way an actual frame is divided into blocks (refer to FIG. 3). Each virtual block is a reference to a data location in the data file, rather than the data itself. The virtual frame table is constantly updated and always stores the most recent data location for each block making up the frame. The virtual frame table can be used to help reconstruct a current frame of video image by locating the most recent occurrence of each block in the data file, reading the blocks, and assembling the blocks together to form the frame. The virtual frame table may be implemented by a data structure such as an array. During video recording, the virtual frame table is preferably stored in a RAM of the video log server 50.

FIG. 6A schematically illustrates the relationship between the frames being transmitted at the transmitting end (KVM server) and the virtual frame table maintained at the receiving end (video log server). In this particular example, blocks 1, 3 and 4 of the video frame are not changed from frame #1 (time t1) to frame #2 (time t2), but block 2 is changed. Thus, in the virtual frame table at time t2, data location 200 (for frame 1 block 2) is replaced by data location 500 (for frame 2 block 2), and the data locations for rest of the blocks are unchanged in the virtual frame table.

Figure 6B:
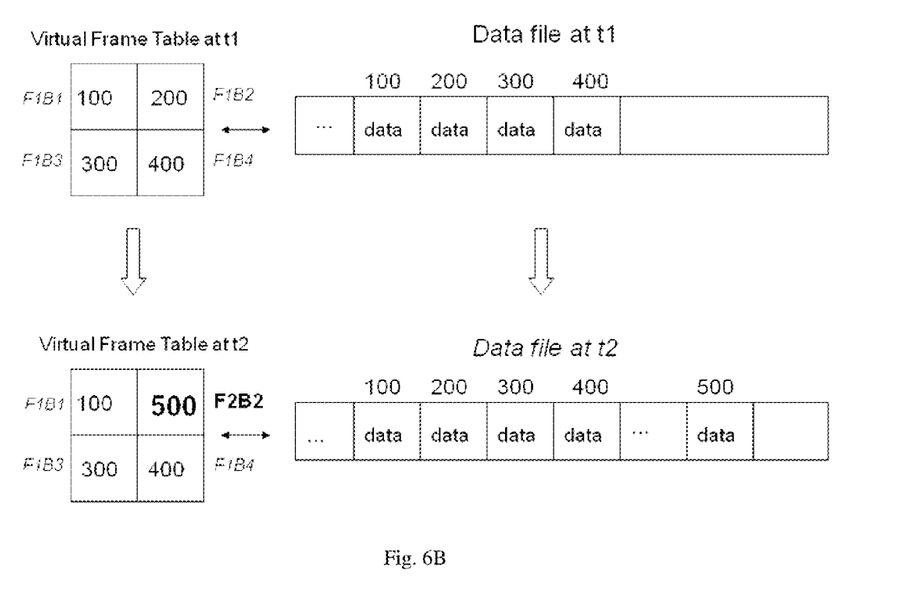
FIG. 6B schematically illustrates the virtual frame table and the data file for the example in FIG. 6A.

FIG. 6B schematically illustrates the virtual frame table and the data file for the example in FIG. 6A and the relationship therebetween. It can be seen that the data location 200 in the virtual frame table (corresponding to block F1B2) at time point t1 is replaced by data location 500 in the virtual frame table (corresponding to block F2B2) at time t2; however, in the data file, the new data for block F2B2 is appended to the data file at the data location 500 and older data for block F1B2 previously recorded at the data location 200 is not deleted.

(3) A snapshot file (see FIG. 7), which stores current copies (snapshots) of the virtual frame table from time to time, for example, periodically every 10 seconds. Each snapshot is a current copy of the virtual frame table at a specific time point, and is stored with a time stamp indicating the absolute time of the time point (such as year, month, date, hour, minute and second) or a relative time of the time point (i.e., relative to the time of the initial frame, or relative to the time of the last snapshot). In addition, the snapshot file stores, for each time point, a next changed frame location which is the data location within the data file where the time stamp or the first changed block for the next changed frame after that time point will be stored.

The time stamp, the copy of virtual frame table and the next changed frame location for each time point may be collectively referred to as a time point record. During video recording, a series of time point records are recorded at predefined time points. The data file is preferably stored in the storage device 52 of the video log server. The time point records are continuously appended to the snapshot file and no data is overwritten. Thus, although the virtual frame table is continuously updated and overwritten, its history is preserved in the snapshot file from time to time.

FIG. 5 illustrates a process performed by the video log server 50 for recording the video data. The process may be implemented by software or firmware stored in the video log server 50. At the start of the process, the video log server 50 receives the block data for the initial frame from the IKVM server 10 (step S51). As mentioned earlier, each block is associated with a block index. The video log server stores these blocks with their block indices in the data file, and stores the data location of these blocks in the virtual frame table to form the initial virtual frame table (step S52). Then, the video log server 50 receives the next changed frame from the IKVM server, including a time stamp and the block data (with block indices) for the changed blocks (step S53), and stores the data in the data file (step S54). The video log server then updates the virtual frame table to reflect the new data locations of the changed blocks (step S55). The process ends if the video log session has ended (for example, the IKVM server may transmit a session end signal to the video log server after the last frame) ("Y" in step S56).

If the video log session has not ended ("N" in step S56), the video log server 50 determines whether it is time to record a time point record (snapshot) (step S57). The time to record a time point record may be determined based on the time lapse since the last time point, where the lapsed time may be measured by a time period (e.g., 10 seconds) or a number of frames (e.g. 300 frames). Alternatively, the time to record a time point record may be determined based on the absolute time of the current frame. If it is time to record a time point record ("Y" in step S57), the video log server stores a time point record for the current time point, including a time stamp indicating the current time (absolute or relative), the current value of the virtual frame table, and a next changed frame location (step S58). After step S58, or if it is not time to record a time point record ("N" in step S57), the process returns to step S53 to receive and record the next frame.

Although not shown in FIG. 5, a time point record may be recorded after the initial frame is recorded in step S52.

The current absolute time stored in the snapshot file is preferably the absolute time when the video frame is generated at the source (i.e. the IKVM server 10). The absolute time when the frame is recorded by the video log server 50 may be different from the absolute time when the video frame is generated at the source due to delay in network transmission and/or buffering. For this purpose, the IKVM server 10 may transmit to the video log server 50 the absolute time of the initial video frame, and the video log server may calculate the absolute time for the subsequent frames based on the absolute time of the initial frame and the number of subsequent frames. The IKVM server 10 may also transmit the absolute time for subsequent frames from time to time.

The virtual frame table may be discarded after the session recording ends as it is no longer useful. The data file and the snapshot file are saved in the storage 52 as a record of the video session. Using these two files, the video images for this recorded session can be replayed from any given time point. Alternatively, after the session recording ends, the video log server may merge these two files into one file.

The data file and the snapshot file, which constitutes the recorded video data, provides a video data format that achieves high compression for certain types of video images, in particular slow-changing video images or video images that remain unchanged for large portions of the image.

FIG. 8 illustrates a process for reproducing (i.e. playing back) the stored video data. This process may be performed by the video log server 50, or by any other suitable device having a processor and software or firmware, which may be generally referred to as a video player device. The method is implemented by software or firmware stored in the video player device.

Figure 9:
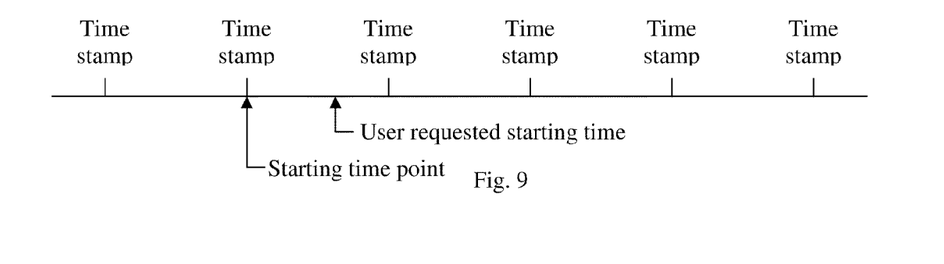
FIG. 9 illustrates a time line showing the relationship of a user-requested starting time and a starting time point for playback.

In step S81, the video player device receives a request from a user (e.g. a client) to play back the video images starting from a requested starting time. The requested starting time may be an absolute time (Greenwich time, local time) or a relative time (e.g. relative to the start of the recording session). The player searches the snapshot file (refer to FIG. 7), using the stored time stamps, to identify a time point which is immediately before the requested starting time (step S82). For example, if the snapshots are recorded at time points every 10 seconds, and the requested starting time is 12:22:43, then the identified time point may be 12:22:40. An example of the relationship among the time stamps in the snapshot file, the user-requested starting time and the starting time point identified by the search is schematically illustrated in a time line in FIG. 9.

From the snapshot file, the player reads the virtual frame table for the identified starting time point (step S83). Based on the virtual frame table, which stores the most recent (up to that time) data locations of all of the blocks making up the frame, the player reads the blocks of data from data file (step S84). The blocks are read from different data locations of the data file as obtained from the virtual frame table. The player then processes each block of data, including decompressing the data (step S85), and assembles the decompressed blocks to form a frame of video image (step S86). This produces the first frame of the played back video image, which is the video frame at the starting time point.

Next, the player reads from the snapshot file the next changed frame location associated with the starting time point (refer to FIG. 7) (step S87). The player then reads the data file sequentially and continuously starting from that location, and reconstructs the subsequent video frames (step S88). More specifically, to reconstruct a next frame based on the previous frame, the played reads the changed blocks for the next frame, processes the blocks of data, and replaces the corresponding blocks in the previous frame with the newly processed blocks to form the next frame. In other words, once a frame is reconstructed, it can be continuously updated by replacing only the changed blocks. As a result, the recorded video images are continuously played back from the starting time point.

Note that as an alternative, for the time period between the starting time point and the user-requested time point, the video log server 50 reconstructs the video frames but does not transmit all such frames to the client 30 (it may transmit the frame immediately before the user-requested time point). As another alternative, the video log server 50 does not reconstruct all of the video frames between the starting time point and the user-requested time point; rather, the video log server 50 uses the data file to build an updated virtual frame table for a time point immediately before the user-requested time point, and the video frame at that time point is reconstructed using the virtual frame table and then played continuously from that time point.

It will be apparent to those skilled in the art that various modification and variations can be made in the video image processing method and apparatus of the present invention without departing from the spirit or scope of the invention. Thus, it is intended that the present invention cover modifications and variations that come within the scope of the appended claims and their equivalents.

What is claimed is:

1. A video recording method implemented in a system which includes a video data transmitting device and a video data recording device, wherein a recording process implemented in the video data recording device comprises:
   (a) receiving input video data, wherein the input video data include a plurality of initial blocks of data collectively representing an initial frame of video image, and further include, for each subsequent changed frame of video image, a time stamp for the changed frame and one or more subsequent blocks of data representing changed blocks of that frame, and wherein the input video data further include a block index associated with each initial and subsequent block of data to indicate a position of the block within the frame of video image;
   (b) storing the initial blocks of data with the associated block indices in a data file, and storing a data location for each initial block in a virtual frame table, wherein the data location for a block indicates a location in the data file where the block is stored;
   (c) for each subsequent changed frame of video image, storing the changed blocks of data with the associated block indices in the data file, and updating the virtual frame table by replacing existing data locations for the changed blocks with new data locations; and
   (d) at each of a plurality of predetermined time points, storing in a snapshot file a time stamp for the time point, a current copy of the virtual frame table at the time point, and a next changed frame location indicating a location in the data file where data for a next changed frame after the time point will be stored,
   wherein the initial blocks for the initial frame and the changed blocks for the subsequent frames are stored in the data file sequentially.

2. The method of claim 1, wherein the time stamp for each changed frame indicates an absolute time or a relative time of the frame.

3. The method of claim 1, wherein the time stamp for each time point indicates an absolute time or a relative time of the time point.

4. The method of claim 1, further comprising a process implemented in the video data transmitting device for generating and transmitting video images which comprises:
   (e) receiving a video signal including a plurality of frames of video image;
   (f) dividing each frame into a plurality of blocks of data which collectively represent the frame;
   (g) processing all blocks of an initial frame, and transmitting the blocks to the video data recording device as the initial blocks of data; and
   (h) for each subsequent frames after the initial frame, comparing each block of the frame with a corresponding block of a previous frame to detect any changes, processing the changed blocks, and transmitting the changed blocks to the video data recording device.

5. The method of claim 4, wherein step (h) further includes transmitting the time stamp for each changed frame before the changed blocks for the changed frame.

6. The method of claim 4, wherein in steps (g) and (h), the processing of each block includes compressing the block.

7. A non-transitory computer program product comprising a computer usable medium having a computer readable program code embedded therein for controlling a video data recording device, the computer readable program code configured to cause the video data recording device to execute a video data recording process, the process comprising: (a) receiving input video data, wherein the input video data include a plurality of initial blocks of data collectively representing an initial frame of video image, and further include, for each subsequent changed frame of video image, a time stamp for the changed frame and one or more subsequent blocks of data representing changed blocks of that frame, and wherein the input video data further include a block index associated with each initial and subsequent block of data to indicate a position of the block within the frame of video image; (b) storing the initial blocks of data with the associated block indices in a data file, and storing a data location for each initial block in a virtual frame table, wherein the data location for a block indicates a location in the data file where the block is stored; (c) for each subsequent changed frame of video image, storing the changed blocks of data with the associated block indices in the data file, and updating the virtual frame table by replacing existing data locations for the changed blocks with new data locations; and (d) at each of a plurality of predetermined time points, storing in a snapshot file a time stamp for the time point, a current copy of the virtual frame table at the time point, and a next changed frame location indicating a location in the data file where data for a next changed frame after the time point will be stored, wherein the initial blocks for the initial frame and the changed blocks for the subsequent frames are stored in the data file sequentially.

8. The non-transitory computer program product of claim 7, wherein the time stamp for each changed frame indicates an absolute time or a relative time of the frame.

9. The non-transitory computer program product of claim 7, wherein the time stamp for each time point indicates an absolute time or a relative time of the time point.

10. The non-transitory computer program product of claim 7, further comprising a computer usable medium having a computer readable program code embedded therein for controlling a video data transmitting device, the computer readable program code configured to cause the video data transmitting device to execute a video data transmitting process, the process comprising: (e) receiving a video signal including a plurality of frames of video image; (f) dividing each frame into a plurality of blocks of data which collectively represent the frame; (g) processing all blocks of an initial frame, and transmitting the blocks to the video data recording device as the initial blocks of data; and (h) for each subsequent frames after the initial frame, comparing each block of the frame with a corresponding block of a previous frame to detect any changes, processing the changed blocks, and transmitting the changed blocks to the video data recording device.

11. The non-transitory computer program product of claim 10, wherein step (h) further includes transmitting the time stamp for each changed frame before the changed blocks for the changed frame.

12. The non-transitory computer program product of claim 10, wherein in steps (g) and (h), the processing of each block includes compressing the block.

* * * * *